Figure 1:
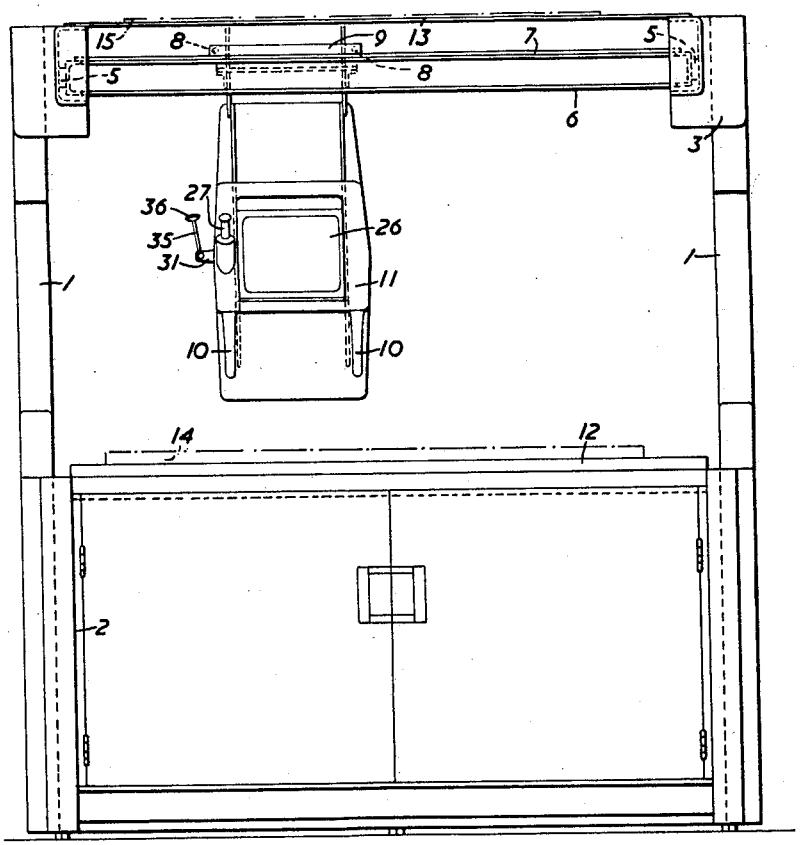

May 26, 1964

W. A. HADLEY ETAL 3,134,296

REGISTERING DEVICES

Filed Oct. 7, 1960

3 Sheets-Sheet 1

INVENTORS
W. A. Hadley
R. J. Fielding
BY H. Ettinger

Morrison, Kennedy & Campbell
ATTORNEYS

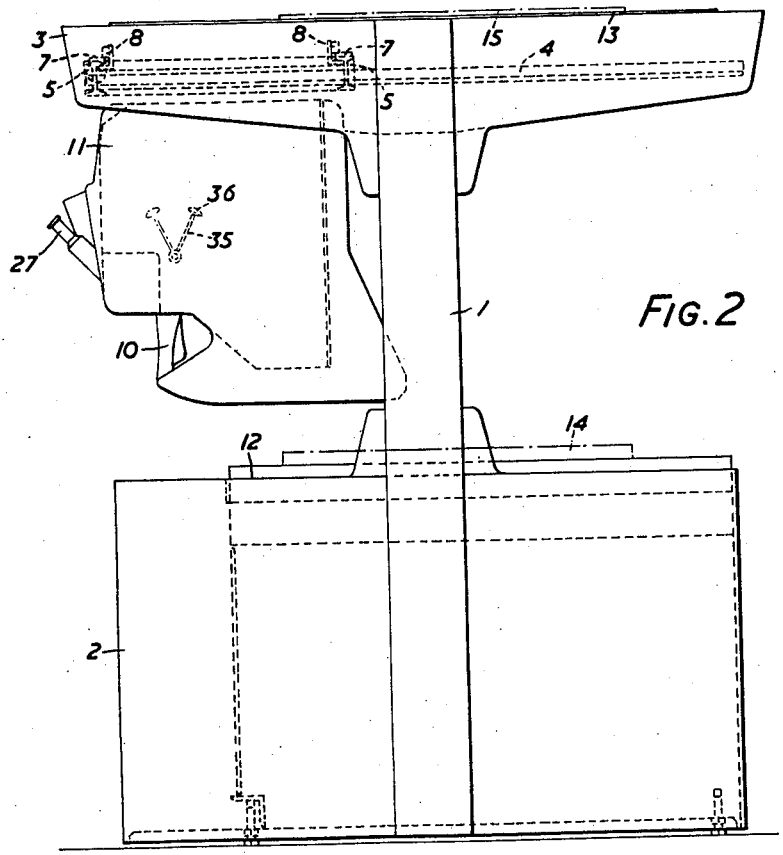
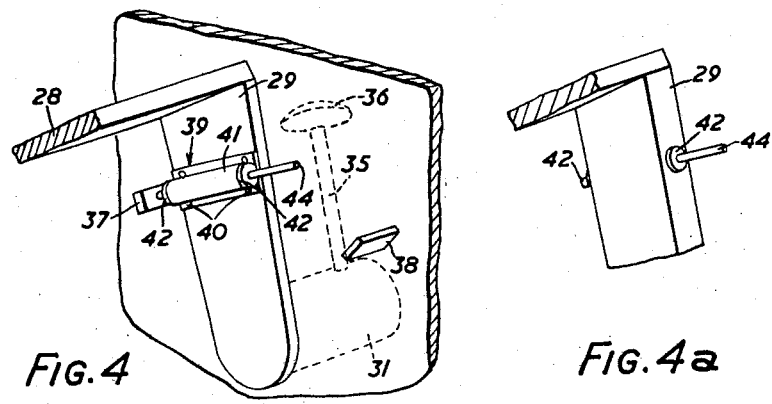

May 26, 1964 W. A. HADLEY ETAL 3,134,296
REGISTERING DEVICES

Filed Oct. 7, 1960 3 Sheets-Sheet 3

United States Patent Office 3,134,296
Patented May 26, 1964

3,134,296
REGISTERING DEVICES
William Alfred Hadley, Tappan, N.Y., and Raymond G. Fielding, Chadderton, and Helmut Ettinger, Manchester, England, assignors to Linotype and Machinery Limited, London, England, a company of Great Britain
Filed Oct. 7, 1960, Ser. No. 61,130
Claims priority, application Great Britain Oct. 9, 1959
7 Claims. (Cl. 88—24)

This invention relates to optical registration apparatus appertaining to printing, and especially colour printing, of the type which incorporates an optical device for affording a view of the combined images respectively from a forme and an artist's layout or a proof from another forme.

One known apparatus of this type consists of a horizontal table for supporting a forme, a transparent plate mounted over the table for supporting the artist's layout or the proof, and a partially transparent reflecting device, supported midway between the table and the plate on tracks for travelling movement in any direction within a horizontal plane, the partially transparent reflecting device being directly viewed by an operator to obtain a true view and a virtual image, respectively, of the forme and layout.

The main object of the present invention is to provide an improved optical device for apparatus of the above kind that will enable the operator to obtain accurate registration of the forme.

According to the present invention there is provided apparatus for preparing and registering the component members of a printing forme so that the members will be in register with a layout, including a forme support and a layout support in superposed parallel relationship thereto, there being interposed between the forme and the layout a partially transparent reflecting device, wherein there is provided optical means for transmitting onto a screen the combined images of the forme and of the layout whereby such adjustments to the forme members as may be necessary to bring them into accurate register with the layout can be observed, and those adjustments made to bring the two images on the screen into accurate register.

Angled mirrors may be used to reflect the two images individually on to a partial reflecting mirror from which the combined images are transmitted through a lens and a series of mirrors on to the viewing screen.

The apparatus may also incorporate a second viewing device such as an eyepiece for affording a magnified view of a selected portion of the combined images. For this purpose a hinged mirror may be mounted for adjustment in such a way that it can be set to intersect the light beam between the partial reflecting mirror and screen so as to divert a selected portion of the combined images for viewing in the eyepiece. To prevent damage to the hinged mirror a dashpot device is fitted to the arm holding the mirror.

The partial reflecting mirror may be a titanium dioxide coated mirror. It is preferred to illuminate the forme and the layout or proof by high intensity light sources of complementary colours, say orange and blue-green. With such an arrangement, the mirror may then be an orange reflecting dichroic mirror which reflects orange light but passes other colours, in order to facilitate maximum optical efficiency, and minimise unwanted reflections from the back surface of the mirror.

Figure 5:
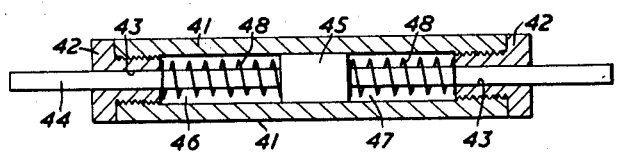
Figure 3:
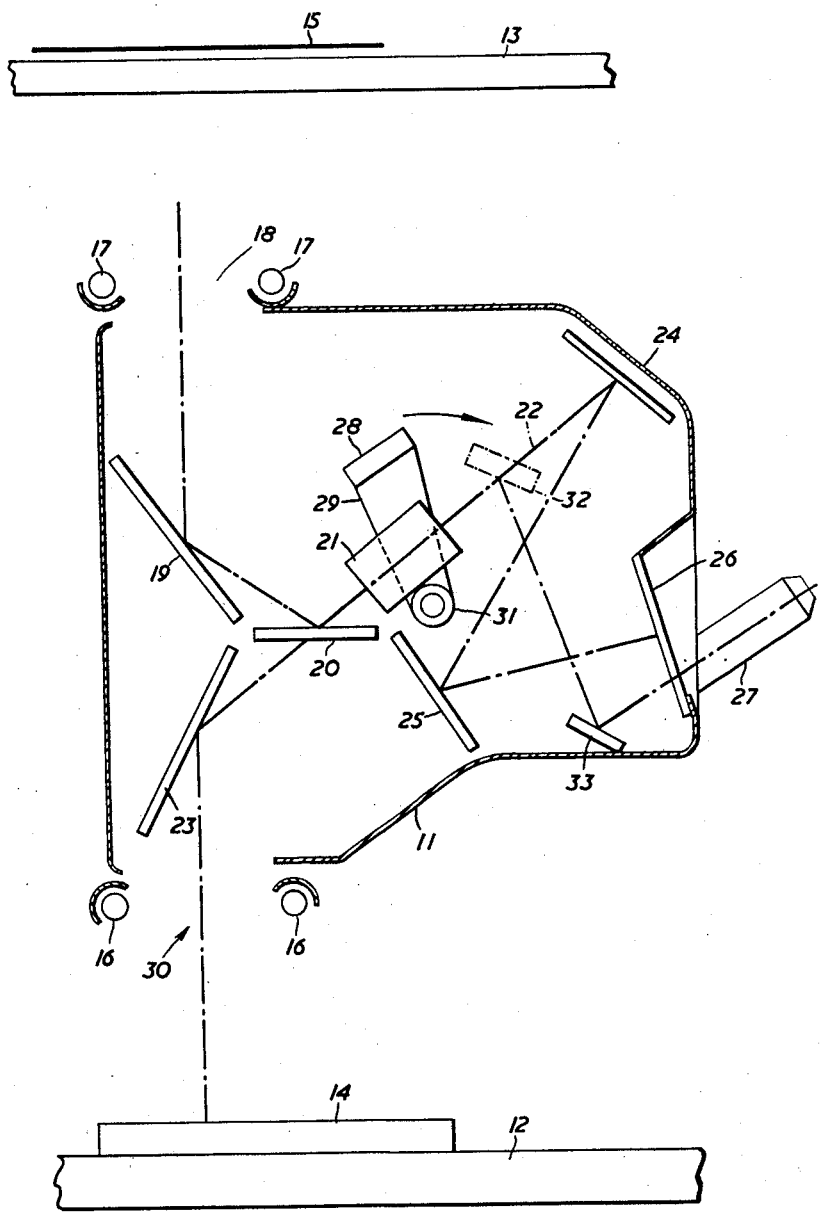

In the accompanying drawings, which show one example of apparatus according to the present invention;

FIGURE 1 is a front elevation,
FIGURE 2 is a side elevation,
FIGURE 3 is a somewhat diagrammatic side elevation showing the arrangement of the optical elements,
FIGURE 4 is a scrap detail of means absorbing shock to a mirror system,
FIGURE 4a is a modified version of a shock absorber, and,
FIGURE 5 is a cross section of a shock absorber.

The optical elements of the apparatus are housed in a casing 11 supported between a rigid horizontal forme supporting table 12 and a canopy 3 fitted with a horizontal layout supporting plate 13 of transparent material, such as glass.

The table 12 is supported by a rigid box structure 2, having uprights 1 supporting the canopy 3.

The casing 11 is supported so as to be capable of adjustment in all directions within a horizontal plane, that is parallel to the table 12 and the glass plate 13. The casing 11 is suspended from a carriage 9 free to run horizontally on wheels 8 along transverse rails 7 of a second carriage 6, the second carriage in turn being movable on wheels 5 along a further pair of horizontal rails 4 which are fixed adjacent to the sides of the canopy 3. The casing is moved to its required position by means of handles 10.

On the table 12 is shown a forme 14 whose printing elements such as blocks and slugs are to be registered with a superposed artist's layout or key proof 15 which is laid flat on the glass plate 13. On the housing 11 are fitted light sources 16, 17 for illuminating respectively the forme 14 and the layout 15. Preferably the light sources are of complementary colours e.g. yellow (or red) and blue (or green). The light source may consist of electric lamps with filters; but in the preferred arrangement, light source 16 consists of mercury vapour lamps giving blue-green light and the source 17 consists of sodium lamps giving orange light.

Orange light reflected from the layout or proof 15 passes through an opening 18 in the top of the casing, and the image is reflected by a mirror 19 on to an orange reflecting dichroic mirror 20, positioned midway between the forme and the layout, whence it is reflected through a projection lens 21 along the inclined axis 22.

A blue-green image of forme 14 is reflected through the bottom casing opening 30 on to an inclined mirror 23, and thence obliquely towards the mirror 20, through which the image is projected along the axis 22 in combination with the orange image.

The combined orange-blue image is reflected back at an acute angle by a mirror 24 on to a further mirror 25. The combined image is then projected by that mirror 25 on to a back projection screen 26, which may be of the Fresnel lens type, in order to concentrate the light leaving the screen at the operator's eye level.

An alternative viewing device in the form of an eyepiece 27 is fixed to the casing 11 for affording a magnified view of a selected portion of the combined image. A mirror 28 is fitted on an arm 29 mounted on a pivot 31 for swivelling movement by a handle 36 from the inoperative position shown in full lines to an operative position 32 shown in dash lines where the mirror intersects the axis 22. The light beam intersected by the mirror is deflected through a fixed mirror 33 into the eyepiece 27.

To prevent damage to the optical system by sudden or violent motion of the handle 36 a damping device, shown in FIGURES 4 and 5 is incorporated.

The pivot 31 passing through a bearing in the wall of the casing 11 has secured thereto an arm 35 terminating in a handle 36. If desired a hand wheel may be secured to the pivot 31 in place of the arm and handle.

The wall of the casing has two stops secured thereto, one stop 37, being that defining the inoperative position of the mirror 28, and the other stop 38 defining the operative position of the mirror 28.

The position of the stops 37, 38 may be adjustable relatively to the wall of the casing 11.

A dashpot, generally designated 39 is secured to the arm 29, as by screws 40, passing through lateral flanges from a barrel 41.

The barrel 41 is threaded internally adjacent its ends for the reception of screwed plugs 42. The plugs each have a central bore 43 through which pass a spindle 44. The spindle 44 has a piston 45 substantially centrally secured thereto or integrally formed therewith.

The piston 45 may be a sliding fit within the barrel, or may be provided with circumferential rings, not shown.

The piston 45 divides the barrel into two chambers 46, 47, defined by an end face of the piston and the inner face of a plug. The volumes of the chambers will be inversely proportional to each other on movement of the spindle.

A helical compression spring 48 is provided in each chamber, the springs being of equal power, just sufficient to centralise the piston after movement of the spindle.

The tolerance between the bore 43 of the plugs and the diameter of the spindle is such that when the spindle is moved, for example, to the left in FIGURE 5, the air compressed in the chamber 46 will bleed to atmosphere.

When the handle is manipulated, as for example, pulled down in FIGURE 4, the spindle will abut against the stop 38 and the spindle will be forced to the left, FIGURE 4. This will compress air in the chamber 46, and, with the compression of the spring 48 in that chamber, effectively damp undesirable shock to the mirror 28 or its setting.

The springs 48 are insufficiently strong to move the arm 29, so that when the handle has completed a movement the system will stay in that position, with the spring substantially compressed and the spindle ends adjacent the stop pushed in substantially as far as it will go.

When the handle is moved in the other direction, the spring acts to return the spindle, and consequently the pistons 45, centrally.

In the modification shown in FIGURE 4a the barrel is formed by drilling a lateral bore in the arm 29, tapping the ends of the bore and screwing in the plugs, the arrangement then being identical with that shown in FIGURE 5. Thus in FIGURE 5 the barrel, referenced 41, could also be a cross section through the arm 29, the only difference being the reference numeral.

The screwed plugs 42 are made from a material suitable for bearings. If desired these plugs may be made from self lubricating flanged sintered bronze bushes, which bushes would not require threading, but would be driven into position.

The optical device may be arranged so that when the forme 14 is exactly in register, the orange and blue images coincide to produce white light. If on the other hand, any of the elements of the forme 14 are out of register, colour fringes will be produced where the overlap occurs. In that case, the forme is adjusted until the colour fringes disappear.

The preferred optical arrangement however is such that when the forme 14 is exactly in register, an orange and blue-green image is projected onto the screen. If on the other hand any of the elements of the forme 14 are out of register, since the type face of the elements of the forme is projected in blue-green on a black background, and the image of the layout or proof appears as black on an orange background, black or white fringes will be produced where the overlap occurs. In that case, the forme is adjusted until the colour fringes disappear.

We claim:

1. Apparatus for preparing and registering the component members of a printing forme so that the members will be in register with a layout, said apparatus comprising, in combination a forme support, a layout support arranged in superposed parallel relationship thereto, and an optical system interposed between the forme and the layout and mounted in a casing which is movable in any direction in a plane parallel to the forme and layout supports, said optical system including a partially transparent reflecting device for transmitting combined images of the forme and layout, two stationary mirrors arranged in superposed relation, one interposed between the forme and the partially transparent reflecting device, and the other interposed between the layout and the partially transparent reflecting device, for reflecting images from the forme and from the layout onto said reflecting device, a common lens unit arranged to receive the combined images transmitted by the partially transparent reflecting device, a viewing screen onto which the combined images from the common lens unit are projected, and a plurality of mirrors interposed between the common lens unit and the viewing screen and which transmit the combined images in magnified form from the lens unit to the screen, whereby such adjustments to the forme members as may be necessary to bring them into accurate register with the layout can be observed and these adjustments made to bring the two images on the screen into accurate register.

2. Apparatus according to claim 1, wherein an image reflected from the forme passes through the partially transparent reflecting device and wherein an image from the layout is reflected from the partially transparent reflecting device, the two images so obtained being transmitted through the common lens unit and projected onto the screen by the interposed plurality of mirrors.

3. Apparatus according to claim 1, wherein the partially transparent reflecting device is a dichroic mirror.

4. Apparatus according to claim 1, wherein the optical system also includes an eyepiece for affording an enlarged view of at least a selected portion of the combined images, and a reflecting mirror arranged between the common lens unit and the viewing screen and which directly intercepts the combined images emanating from the lens unit and directs them to the eyepiece, said mirror being movable at will into and out of the image path to render the eyepiece operative or inoperative as desired as well as simultaneously to render the viewing screen inoperative and operative, respectively.

5. Apparatus according to claim 4, wherein the reflecting mirror for the eyepiece is mounted for a swinging movement into and out of the image path, and including means for dampening the swinging movements of the reflectig mirror to prevent shock to the optical system.

6. Apparatus according to claim 1, wherein the optical system also includes light sources for illuminating the forme and the layout in complementary colours.

7. Apparatus according to claim 6, wherein the light source illuminating the forme is a blue-green light, and the light source illuminating the layout is an orange light.

References Cited in the file of this patent

UNITED STATES PATENTS

| | | |
|---|---|---|
| 2,155,248 | Adams et al. | Apr. 18, 1939 |
| 2,518,240 | Lowber et al. | Aug. 8, 1950 |
| 2,597,636 | Hall et al. | May 20, 1952 |
| 2,642,487 | Schroeder | June 16, 1953 |
| 3,055,261 | Braun et al. | Sept. 25, 1962 |

FOREIGN PATENTS

| | | |
|---|---|---|
| 462,373 | Canada | Jan. 10, 1950 |